United States Patent [19]

Payne, III

[11] Patent Number: 4,696,000
[45] Date of Patent: Sep. 22, 1987

[54] NONBLOCKING SELF-ROUTING PACKET AND CIRCUIT SWITCHING NETWORK

[75] Inventor: William A. Payne, III, Lombard, Ill.

[73] Assignee: American Telephone and Telegraph Company, AT&T Bell Laboratories, Murray Hill, N.J.

[21] Appl. No.: 808,344

[22] Filed: Dec. 12, 1985

[51] Int. Cl.[4] .......................................... H04Q 11/04
[52] U.S. Cl. ...................................................... 370/60
[58] Field of Search ...................... 370/60, 94, 58, 63, 370/110.1; 340/825.8

[56] References Cited

U.S. PATENT DOCUMENTS

| | | | |
|---|---|---|---|
| 3,129,407 | 4/1964 | Paull | 340/147 |
| 3,674,938 | 7/1972 | Jacob | 340/825.5 |
| 4,038,638 | 7/1977 | Hwang | 340/166 R |
| 4,400,627 | 8/1983 | Zola | 340/825.8 |
| 4,566,007 | 1/1986 | Richards | 340/825.8 |
| 4,630,258 | 12/1986 | McMillen et al. | 370/94 |

OTHER PUBLICATIONS

D. Nassimi et al., "Parallel Algorithms to Set Up the Benes Permutation Network", *IEEE Transactions on Computers*, vol. C-31, No. 2, Feb. 1982, pp. 148-154.
D. Nassimi et al., "A Self-Routing Benes Network and Parallel Permutation Algorithms", *IEEE Transactions on Computers*, vol. C-30, No. 5, May 1981, pp. 332-340.
F. K. Hwang, "Three-Stage Multiconnection Networks Which are Nonblocking in the Wide Sense", *The Bell System Technical Journal*, vol. 58, No. 10, Dec. 1979, pp. 2183-2186.
S. Sakata et al., "Synthesis of Multiconnected Switching Networks", *Electronics and Communications in Japan*, vol. 58-A, No. 1, 1975, pp. 51-57.
D. C. Opferman et al., "On a Class of Rearrangeable Switching Networks Part I: Control Algorithm", *The Bell System Technical Journal*, vol. 50, No. 5, May-Jun., 1971, pp. 1579-1600.
A. Waksman, "A Permutation Network", *Journal of the Association for Computing Machinery*, vol. 15, No. 1, Jan. 1969, pp. 159-163.
V. E. Benes, "On Rearrangeable Three-Stage Connecting Networks", *The Bell System Technical Journal*, vol. XLI, Sep. 1962, No. 5, pp. 1481-1492.
C. Clos, "A Study of Non-Blocking Switching Networks", *The Bell System Technical Journal*, Mar. 1953, pp. 406-424.

Primary Examiner—Douglas W. Olms
Assistant Examiner—Frank Scutch
Attorney, Agent, or Firm—John C. Moran

[57] ABSTRACT

A packet switching architecture in which switching network nodes automatically determine nonblocking paths through a switching network in response to address information. The switching network comprises stages of broadcast and routing nodes. The broadcast nodes are responsive to the transmission of address information from an input port to create a plurality of paths through the switching network and to communicate on this plurality of paths the address information to the routing stages. Each of the routing switch nodes is responsive to receipt of address information to select one of the paths to an address-designated output port. The final path is established by the output port transmitting an acknowledge signal back through the switching network. Each node upon receipt of the acknowledge signal establishes the path through the itself.

10 Claims, 5 Drawing Figures

NETWORK 100

NONBLOCKING SELF-ROUTING PACKET AND CIRCUIT SWITCHING NETWORK

TECHNICAL FIELD

This invention relates to a method and switching architecture for the switching of packets and circuit switched information. The invention specifically pertains to a self-routing switching architecture which is nonblocking.

BACKGROUND OF THE INVENTION

Self-routing packet switching networks with multiple paths through the network are known. These self-routing networks have a plurality of paths but are not nonblocking from any given input port to an output port. One such system is described in U.S. Pat. No. 4,550,397, by J. S. Turner, et al. The latter describes a system in which switching network nodes automatically determine an alternate route through a switching network so as to increase reliability and distribute traffic. The switching network comprises stages of distribution and routing nodes. The routing nodes are responsive to physical addresses associated with the packets to communicate those packets to address designated downstream nodes. The distribution switching nodes statistically communicate packets to downstream switching nodes on the basis of an alternate routing algorithm and availability of downstream nodes. The initial network stages are alternate distribution and routing stages followed by only routing stages for the remaining stages of the network.

The previously described packet switching network of Turner only allows the communication of packets through the switching network. Circuit switching requires a path to remain setup for an indefinite period of time, and the network described by Turner cannot perform this type of operation because a large portion of the paths would become blocked.

Another packet switching network is described in the application of C. A. Lea and W. A. Montgomery, "A Self-Routing Packet Switching Network with Intra-Stage Packet Communication," Ser. No. 654,763, filed Sept. 26, 1984. This application discloses a packet switching network in which self-routing packets are communicated through the network by intra-communication of the packets within a stage as well as inter-communication of packets among stages. The stages each have a plurality of pairs of switch nodes with each pair having an intranode link between the pair of nodes. Each of the switch nodes comprise input controllers and output controllers. The input controller of a node is responsive to the receipt of a packet for interrogating the address field of the packet to determine the destination of the packet. That input controller, on the basis of the destination determination, communicates the packet towards the destination via either an inter-stage link or an intranode link on the basis of availability of the links and an internal control circuit.

A switching network for providing both packet and circuit switched information communication is described in the application of C. A. Lea, "Multiple Paths in a Self-Routing Packet and Circuit Switching Network," Ser. No. 654,765, filed Sept. 26, 1984. This self-routing network has a plurality of stages and the stages are interconnected by links. Each pair of switch nodes within a given stage share the same set of input links from the preceding stage. In response to the receipt of address information from an originating interface controller transmitted via a link, a pair of nodes determine one of a multitude of paths through the switching network by one of the pair responding to the address information to communicate the address information to the next sequential stage after establishing a path through that particular switch node. Once a path has been established through the switch node, an acknowledge signal is transmitted back to the network from the destination trunk controller indicating that a path has been established. The path remains established until the end field of the packet is detected or the proper end information is transmitted after the transmission of the circuit switched information.

Nonblocking networks are known. The simplest of nonblocking networks that is capable of interconnecting $N_1$ input terminals and $N_2$ output terminals uses a rectangular $N_1 \times N_2$ array of switching elements or crosspoints. Although such a rectangular array is nonblocking in that any two idle customer terminals are always connectable regardless of the array interconnection of the other terminals, the rectangular array is not a practical network in most applications due to the prohibitive cost of the large number of array crosspoints.

One known nonblocking network having significantly fewer crosspoints than a rectangular array is disclosed in the article by C. Clos, "A Study of Non-blocking Switching Networks," *Bell System Technical Journal*, March, 1953, pp. 406–424. The network described in the latter article is termed a strictly nonblocking network. A network which is rearrangably nonblocking is described in the article by V. E. Benes, "On Rearrangable 3-Stage Connecting Networks," *Bell System Technical Journal*, Vol. 41, No. 5, September, 1962, pp. 1481–1492. Another rearrangeable network is described in U.S. Pat. No. 4,038,638 issued to F. K. Hwang, on July 26, 1977. The previously described networks are all controlled by a central control unit normally a computer. The problem with a central control unit being responsible for the allocation of paths through a network is that the central control can become a bottleneck when the switching application requires the high-speed switching of packets. The reason is that such applications require very high reconfiguration rates, and the speed at which information is clocked through the data paths is not as important as the rate at which the switch paths can be reconfigured. The ability to rearrange also requires a global view of the status of the network which is also true of the Clos network described in the previously referenced article.

From the foregoing, it can be seen that there exists a need for a self-routing network which is nonblocking and yet does not require the performance of complex routing calculations at each node. In addition, this network should be readily expandable.

SUMMARY OF THE INVENTION

The aforementioned problems are solved and a technical advance is achieved in accordance with the principles of this invention incorporated in a self-routing, switching network architecture comprising stages of broadcast and routing switch nodes that can always provide a path between any network input port to any network output port provided the output port is idle.

Advantageously, the network is capable of switching either packets or circuit switched information. A path is set up through the network by an input port initially transmitting address information to the network. The network is responsive to this address information to determine a path to the address designated output port. The output port transmits an acknowledge signal back to the input port via the path being set up upon receiving a path setup signal. The acknowledge signal is routed through the network via the path, and each node receiving the acknowledge signal establishes a portion of the path through itself.

Also, switch nodes in the broadcast stages are responsive to receipt of the address information to communicate the received address information to a plurality of stage in the next downstream node thereby creating a plurality of a possible paths through the network. In addition, the nodes in the routing stages are responsive to receipt of sets of identical address information received from upstream nodes to select one set of address information, to interrogate the address information, and to determine the switch node in the next downstream stage that is to receive the address information. Also, all of the nodes are responsive to the receipt of end signals to remove the portion of the network path that they are implementing.

Specifically, the nonblocking, self-routing, switching network comprises n routing stages and n−1 broadcast stages with the broadcast stages being grouped first in the network followed by the routing stages. Each of the broadcast nodes has two input terminals and three output terminals. Each node of the first sequential routing stage has two input terminals and two output terminals with the nodes of the remaining routing stages having three input terminals and two output terminals. Interstage links individually connect an output terminal of an upstream node to an input terminal of a downstream node. Each of the broadcast nodes is responsive to receipt of the address from one of its input terminals for retransmitting the address to the next downstream stage via all of the idle output terminals of the node and for entering a path setup state for potentially setting up a path from the active input terminal to the output terminal that subsequently receives an acknowledge signal from the downstream stage.

Also, each of the routing nodes is responsive to the address received on an input terminal for interrogating that address to determine the output terminal designated by the address and then to recommunicate the address to the next downstream node via the designated output terminal. The routing node then enters the path setup state waiting for an acknowledge signal on the designated output terminal so as to establish a path from the input terminal to the designated output terminal. All the nodes are responsive to receipt of the acknowledge signal for establishing a path through the receiving node and to enter a busy state with respect to the input and output terminals associated with that path.

Advantageously, each of the routing nodes comprises a priority circuit such that the receipt of multiple addresses on a number of input terminals results in only one of the input terminals being selected for the path setup operation. Also, each of the broadcast nodes has a priority circuit that selects only one of the output terminals for utilization in the path currently being set up through the network upon multiple acknowledge signals being received.

DETAILED DESCRIPTION

Figure 1:
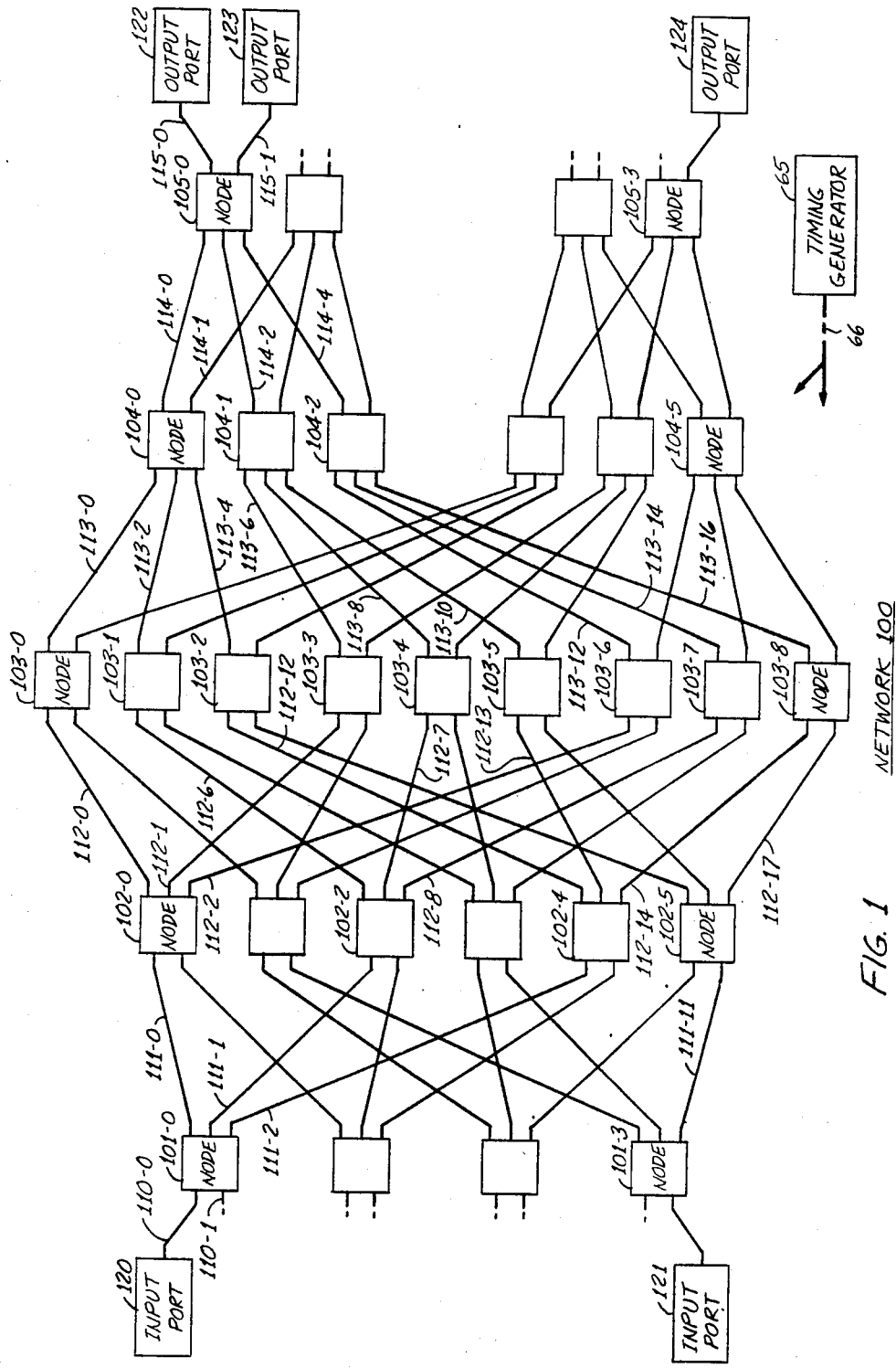
FIG. 1 illustrates, in block diagram form, the switching network which is the subject matter of this invention.

FIG. 1 shows an illustrative packet switching network which is the focus of this invention. The switching network illustrated in FIG. 1 is capable of interconnecting any input port to any output port as long as the output port is idle. A connection is established through network 100 by an input port transmitting the address of the output port with which the connection is to be established to network 100. Under control of timing generator 65, only one input port at a time attempts to establish a connection. The path is removed by the input port transmitting a bit pattern referred to as an end flag. For example, input port 120 transmits the address of "001" in binary to node 101-0 via link 110-0 in order to establish a connection with output port 123. Network 100 is made up of five stages. Stage 1 comprises nodes 101-0 through 101-3, stage 2 comprises nodes 102-0 through nodes 102-5, stage 3 comprises nodes 103-0 through 103-8, stage 4 comprises nodes 104-0 through 104-5, and stage 5 comprises nodes 105-0 through 105-3. A node in stages 1 and 2, upon receiving address information, retransmits this address information on all of its idle output links. Each node of stages 3, 4, and 5, are responsive to receipt of the address on incoming links to select one of the incoming links as the active link for this path setup and to interrogate the most significant bit of the received address to determine on which of its two output links to retransmit the address after deleting the most significant bit from the address. All nodes, after retransmitting the address, enter a request state also referred to as a path setup state during which they await an acknowledge signal from the downstream stage.

For example, node 101-0 is responsive to the address bits of "001" to retransmit these address bits on the idle ones of links 111-0, 111-1, and 111-2. Assuming that all of the previous links were idle, nodes 102-0, 102-2, and 102-4 of stage 2 receive the address bits. If all of the output links 112-0 through 112-2, 112-6 through 112-8, and 112-12 through 112-14 are idle, then nodes 103-0 through 103-8 of stage 3, each receive the address bits "001". Each of these nodes is responsive to the most significant "0" of the latter address bits to transmit these bits to nodes 104-0 through 104-2 on the address designated even numbered links of links 113-0 through 113-17, assuming all of these links are idle. Before transmitting the address bits, the most significant "0" is deleted and the resulting address bits "01" are transmitted. Each of nodes 104-0 through 104-2 is responsive to the transmitted address bits to interrogate the most significant bit to determine the output link and to delete the latter bit and to attempt to transmit the remaining address bit "1" to node 105-0 via the idle ones of the determined even-numbered links 114-0 through 114-4. Node 105-0 is responsive to the received address bit to interrogate the received bit to determine the output port and to transmit a request signal to output port 123 if it is idle. Output port 123 is responsive to the request to transmit back an acknowledge signal via conductor 115-1.

The manner in which network 100 relays the acknowledge signal from the output port back to the requesting port determines the actual path set up through network 100. As previously noted, each of the designated nodes of stages 3, 4, and 5 only accepts the transmitted address from one upstream node. Hence, there is only one active link between node 104-0 and stage 3 over which the acknowledge signal is returned from node 104-0 to stage 3. However, between stages 1 and 2, all of the previously described links are potentially active and waiting the arrival of the acknowledge signal. Node 105-0 is responsive to the acknowledge signal received from output port 123 via link 115-1 to transmit this acknowledge signal to node 104-0 via link 114-0. Node 105-0 does not transmit the acknowledge signal to nodes 104-1 and 104-2 since node 105-0 had previously selected node 104-0 during the transmission of the address bits. Similarly, node 104-0 transmits the acknowledge signal via link 113-0 to node 103-0. Node 103-0 transmits the acknowledge signal via link 112-0 to node 102-0. The latter node is responsive to the acknowledge signal to transmit it via link 111-0 to node 101-0 which then relays the acknowledge signal to input port 120 via link 110-0. Each node, upon receiving the acknowledge signal, enters the busy state awaiting the transmission of data from the active input link in order to communicate received data to the active output link. The nodes which had not received the acknowledge signal, but had received the address signals, are forced into the idle state after a predefined amount of time by timing generator 65. The response of the nodes with respect to the acknowledge signal is discussed in detail with respect to FIGS. 2 through 5.

Figure 2:
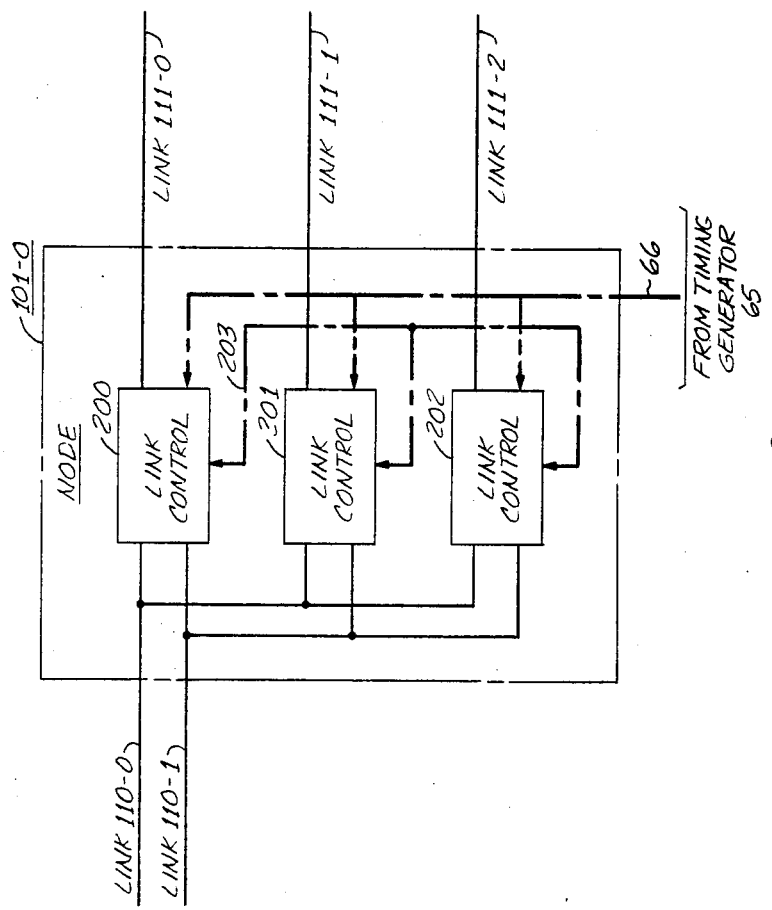
FIG. 2 is a detailed block diagram of switch node 101-0 of FIG. 1.

Node 101-0 of FIG. 1 is illustrated in greater detail in FIG. 2. Node 101-0 comprises link control circuits 200, 201, and 202. If one of the link control circuits is communicating data from an input link to its attached output link, the link control circuit transmits a signal via cable 203 indicating that the input link is busy. Considering the previous example, upon node 101-0 receiving the transmitted address from input port 120 via link 110-0, and link control circuit 200 being in the idle state, the latter circuit is responsive to the address received link 110-0 to enter the setup state and to commence transferring the address bits to link 111-0. After link control circuit 200 has transferred all of the address bits to link 111-0, the latter circuit enters the wait state. If link control circuits 201 and 202 are also in the idle state, upon receipt of the address bits, they also enter the setup state and transfer the address information to links 111-1 and 111-2, respectively, before entering the wait states. The link control circuits are transferred from the wait state to the busy state by reception of the acknowledge signal from a downstream node or at the end of the setup time by being reset by timing generator 65 via cable 66.

Assuming that link control circuit 200 receives the acknowledge signal via link 111-0, it enters the busy state which establishes a path from link 110-0 to link 111-0 until the end flag is received. In addition, link control circuit 200 retransmits the acknowledge signal to input port 120 via link 110-0. The nodes in stages 1 and 2 are identical in design.

Figure 3:
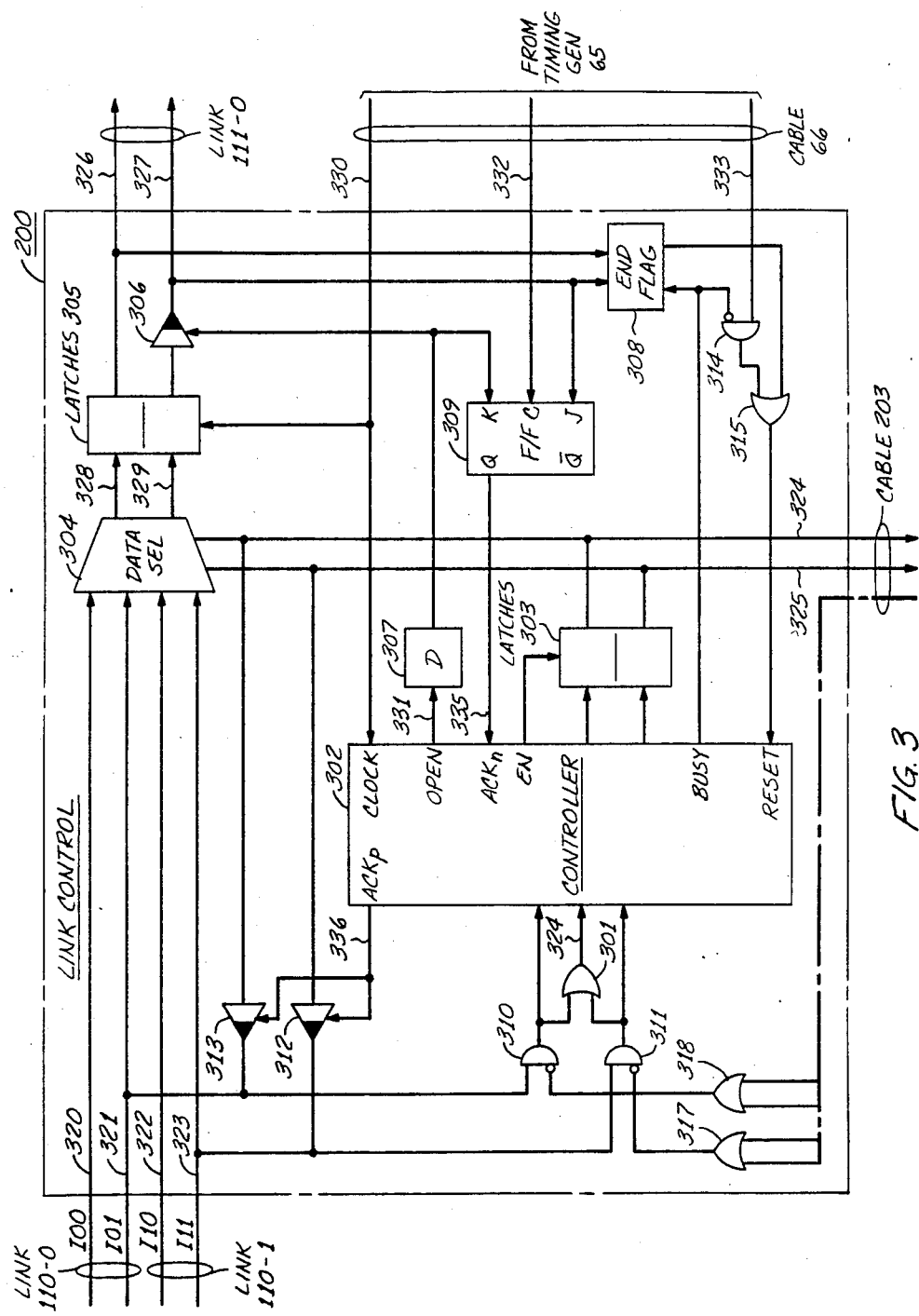
FIG. 3 illustrates in greater detail, link control 200 of FIG. 2.

Link control circuit 200 is illustrated in greater detail in FIG. 3. Link control circuits 201 and 202 are identical in design. As illustrated in FIG. 3, each link comprises two conductors, for example, link 110-0 comprises conductors 320 and 321. These conductors are designated as the even and odd conductors, I00 and I01, respectively. As previously described, each of the three link control circuits within a node can independently be in one of four states: idle, setup, wait, and busy. When the link control circuit is in the busy state, the two conductors in each link both have the function of transferring the data information to the link control circuit. During the busy state, one conductor (even conductor) communicates all of the even data bits, such as D0, and the other conductor (odd conductor) communicates all odd bits, such as D1. During the idle, setup, and wait states, however, these two conductors within a given link serve different purposes and are designated as the even and odd conductors. For example, within link 110-0, conductor 320 is designated as I00 (even conductor), and conductor 321 is designated as I01 (odd conductor).

During the setup state, the originating input port transmits a setup signal for five clock signals on the odd conductor and transmits the address information on the even conductor during the last three clock signals. The input port also provides bit stuffing so that the end flag bits do not appear in the data during the busy state of the nodes.

Consider now, the operation of link control circuit 200, as illustrated in FIG. 3. Controller 302 performs the control functions for link control circuit 200. Controller 302 may advantageously be constructed using well-known program logic arrays and flip-flops. Gates 301, 310, 311, 317, and 318 are operational during the setup state to detect the setup signal and to signal controller 302 via conductor 324 of this fact. In addition, the latter gates detect the end of the setup state and signals controller 302 to enter the wait state.

Elements 303, 304, and 305 are utilized to transfer information from a selected link to outgoing link 111-0. These elements become operational during the setup state after the setup signal is detected on the active incoming link and communicate the remainder of the address information and the setup signal to link 111-0. The latter elements are also operational during the busy state to transfer the information data from the selected input link to link 111-0. However, during the wait state, elements 303, 304, and 305 are not active and do not transfer any bits on link 111-0. Since during the wait state, link control 200 is awaiting the acknowledge signal from stage 2 via conductor 327.

Flag detector 308 is responsive to the receipt of the end flag in the information data to signal controller 302 to enter the idle state. Elements 312 and 313 are utilized by controller 302 to retransmit the acknowledge signal received from stage 2 back to input port 120.

As in the previous example, assume that link control circuit 200 is in the idle state and is receiving the setup signal and the address bits of "001" from input port 120 via link 110-0. Link control 200 is responsive to this information on conductors 320 and 321 to detect the setup signal being transmitted via conductor 321 by OR gate 318, AND gate 310, and OR gate 301 and to transmit a "1" signal to controller 302 via conductor 324. Gates 310 and 318 verify that the information being detected on conductor 321 is not due to data information being handled by link control 301 or 302, but is truly a setup signal. Controller 302 stores a "1" in the least significant position of latches 303. Data selector 304 is responsive to the output of latches 303 to select conductors 320 and 321 and to transfer the information on these conductors to latches 305 via conductors 328 and 329. The information on conductors 328 and 329 is stored in the latches 305 upon the rising edge of the clock pulse received via conductor 330 from cable 66 from the timing generator 65. Latches 305 then transfer the information on link 110-0 to conductors 326 and 327.

The end of the information being received from link 110-0 is detected by the absence of the setup signal on conductor 321. Elements 310, 318, and 301 detect the absence of the setup signal and transfer this fact to controller 302 by the transmission of a "0". Controller 302 is responsive to the absence of the setup signal to enter the wait state. Upon entering the wait state, controller 302 transmits a signal via conductor 331 from the OPEN terminal. The signal transmitted via conductor 331 disables transreceiver 306 via delay 307. Transreceiver 306 is disabled so that the acknowledge signal can be received back from node 102-0 via conductor 327 of link 111-0. While in the wait state, link control circuit 200 awaits the arrival of the acknowledge signal via conductor 327. The receipt or absence of the signal is clocked into flip-flop 309 by a signal received via conductor 332 from timing generator 65 at the appropriate time that the acknowledge signal should be received by the first stage. Link control circuit 201 receives a similar clocking signal from timing generator 65 but one clock time later than circuit 200, and link control circuit 202 also receives a similar signal two clock times later. Staggering of these clocking signals from generator 65 results in a predefined priority of how node 101-0 responds to receipt of multiple acknowledge signals from the second stage. Each node in stage 1 receives the signal transmitted via conductor 332. If the acknowledge signal is being communicated via conductor 327, then flip-flop 309 is set via the J input. However, if the acknowledge signal is not being communicated via conductor 327, then the flip-flop 309 is reset via the K input which is connected to the OPEN signal being transmitted via conductors 331 and 307. If the acknowledge signal is received, setting flip-flop 309, a signal is transmitted via conductor 335 to the $ACK_n$ input of controller 302. In response to the signal received via terminal $ACK_n$, controller 302 enters the busy state and retransmits the acknowledge signal via conductor 321 and transreceiver 313 to input port 120 by transmitting a signal from output terminal $ACK_p$ on conductor 336.

If the acknowledge signal is not received, then the controller is reset to the idle state by AND gate 314 via OR gate 315. This results by the transmission of the path signal which is received from the timing generator via conductor 333 to AND gate 314 and the fact that the controller 302 is not in the busy state.

While in the busy state, controller 302 transfers any subsequent data received on conductors 320 and 321 to conductors 326 and 327 of link 111-0, respectively, while monitoring the data being transferred to detect the end flag. When the end flag is detected by flag detector 308 (which is enabled by the busy signal), a signal indicating this fact is transmitted to controller 302 via OR gate 315. Controller 302 is responsive to the receipt of the end flag indication to enter the idle state.

Figure 4:
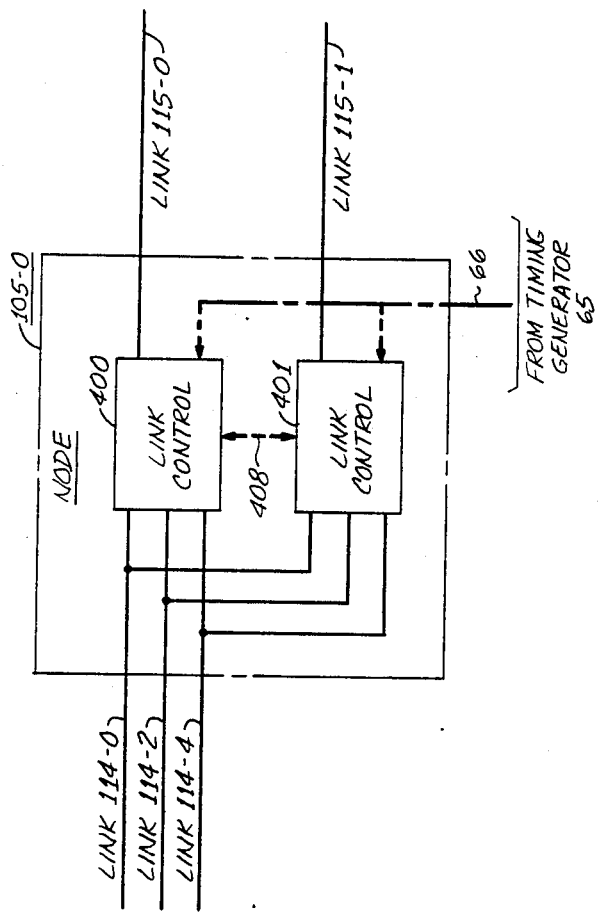
FIG. 4 is a detailed block diagram of switch node 105-0 of FIG. 1.

Node 105-0 of FIG. 1 is illustrated in block diagram form in FIG. 4. The other nodes of stages 4 and 5 are identical in design to node 105-0. The nodes of stage 3 differ from the block diagram of node 105-0 in that they only have two input links rather than three. As previously described with respect to FIG. 1, node 105-0 is responsive to the most significant address bit being a "0" to transfer the information to link 115-0 and responsive to a "1" in the most significant address bit to transfer the information to link 115-1. Link control circuit 400 is responsive to the most significant address bit being a "0" for transferring the path to link 115-0, and link control circuit 401 is similarly responsive to the most significant address bit being a "1" to establish a path to link 115-1. If simultaneous address information appears on both links 114-0 through 114-2 and the most significant address bit is a "0", link control circuit 400 selects link 114-0 for establishing a path to link 115-0. The predefined priority of the input links for link control circuit 400 from the highest to the lowest is link 114-0, link 114-2, and 114-4. The same predefined priority is observed by link control circuit 401.

As previously described, an idle link control circuit detects the fact that address information is being transmitted via a link by the detection of the setup signal being transmitted via the odd conductor. Link control circuits 400 and 401 function in the same manner. Because of the fact that an idle link control circuit could mistakenly identify data being transmitted on a link that is being connected to an outgoing link by another link controller circuit and assume that a path is being set up, it is necessary for link control circuits 400 and 401 to indicate not only that they are busy, but what input link they are presently busy on. This information is transferred between the link control circuits of FIG. 4 via cable 408.

Figure 5:
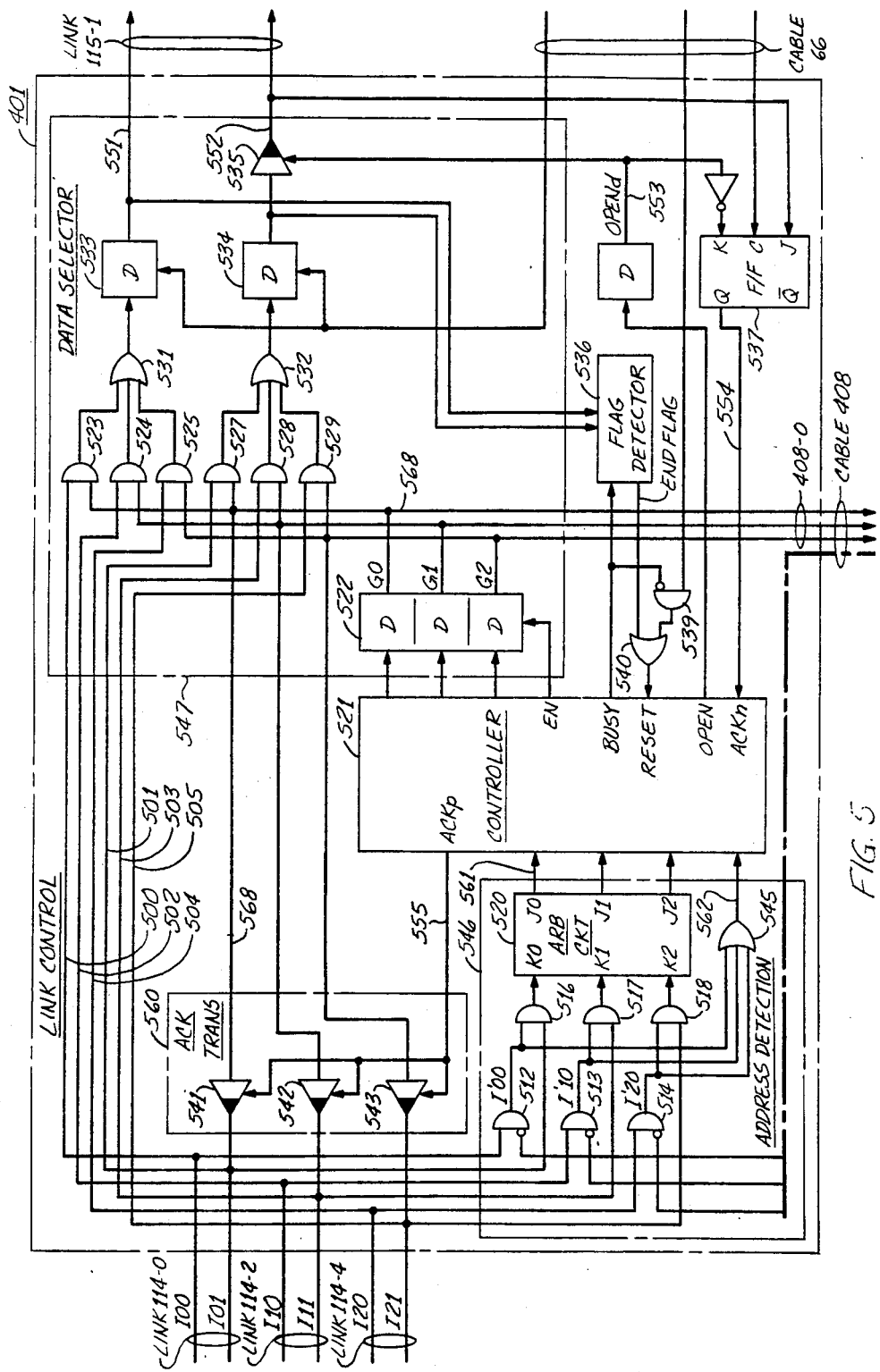
FIG. 5 illustrates in greater detail, link control 401 of FIG. 4.

Link control circuit 401 is illustrated in detail in FIG. 5 Link control circuit 400 is identical in design. The link control circuits of the other nodes of stages 4 and 5 are also identical in design; however, the link control circuits of the nodes of stage 3 differ in that they have only two-thirds of the data paths illustrated in FIG. 5 since there are only two input links to the nodes of stage 3. The design of the nodes of stage 3 would be obvious to one skilled in the art based on FIG. 5.

As illustrated in FIG. 5, each link comprises two conductors, for example, link 114-0 comprises conductors 500 and 501. As previously described, each of the two link control circuits within a node can be in one of four states: idle, setup, wait, and busy. When the link control circuit is in the busy state, the two conductors in each link both have the function of transferring the data information to the link control circuit. During the busy state, one conductor (even conductor) communicates all the even data bits, such as D0, and the other conductor (odd conductor) communicates all odd data bits, such as D1. During the idle, setup, and wait states, however, the two conductors within a given link serve different purposes and are designated as even and odd conductors. For example, within link 114-0, conductor 500 is designated as I00 (even conductor), and conductor 501 is designated as I01 (odd conductor). As previously described, during the setup state, the setup signal is transmitted by the originating input port on the odd conductor.

Consider now the operation of link control 401 of FIG. 4, as illustrated in FIG. 5. Link control circuit 400 is similar in design and the differences are pointed out in the following discussion. Controller 521 performs the control functions for link control 401. Address detection block 546 is operational during the setup state to detect the occurrence of the address bit being received from one of the attached links and to ascertain that link control circuit 400 is not currently switching data for that particular link. In addition, address detection block 546 detects the end of the setup state in order to signal controller 521 to transfer to the wait state. Address detection block 546 determines that the setup state is over when it is no longer receiving the setup signal.

Data selection block 547 is utilized to transfer information from a selected link to outgoing link 115-1. Data selection 547 becomes operational during the setup state after the first bit of the address information has been decoded; and the determination is made that link control circuit 401 is to communicate the remainder of the address information and setup signal to link 115-1. Data selection block 547 is also operational during the busy state to transfer the information data from the selected input link to link 115-1. However, during the wait state, data selection block 547 is not active and does not transfer any bits on link 115-1. Since during the wait state, link control circuit 401 is awaiting the acknowledge signal from output port 123 via conductor 552 of link 115-1.

Flag detector 536 is responsive to the receipt of the end flag in the information data to signal controller 521 to enter the idle state. Acknowledge transmission block 560 is utilized by controller 521 to retransmit the acknowledge signal received from output port 123 back to stage 4.

Consider the previously described example where node 105-0 received via link 114-0 the most significant address bit of a "1". Further assume, that link control circuit 401 is in the idle state. In order to determine whether link control circuit 400 is presently busy on link 114-0, gate 512 responds to the G0 bit of link control 400 which is being transferred to gate 512 via cable 408 from latches similar to latch 522. If the input from cable 408 to gate 512 is a "0", this indicates that the link is not active with respect to link control circuit 400 for the transmission of data or path setup information. Since the address bit on conductor 501 is a "1", the output of gate 516 transmits a "1" to arbitration circuit 520. A gate similar to gate 516 in link control circuit 400 only responds to the address bit being a "0". Arbitration circuit 520's outputs, J0 through J2, respond to its inputs, K0 through K2, as defined by the following equations:

$$J_0 = K_0$$

$$J_1 = \overline{K_0}$$

$$J_2 = \overline{K_0}\, \overline{K_1}\, K_2$$

Arbitration circuit 520 is responsive to a "1" received on its K0 input from gate 516 to transmit a "1" to controller 521 via conductor 561. Controller 521 is responsive to a "1" on conductor 561 to leave the idle state and enter the setup state and to set the G0 bit position of latch 522 to a "1". When the G0 bit position is set, a "1" is transmitted via conductor 568 to gates 523 and 527, and the latter is enabled to transfer the subsequent information being received on conductors 500 and 501 to conductors 551 and 552 which are the conductors of output link 115-1 via gates 531, 532, flip-flop 533 and flip-flop 534 plus gate 535. In addition, the fact that G0 bit in latch 522 has been set is transmitted via cable 408 to link control circuit 400 to indicate that link 115-1 has been selected by link control circuit 401 to be busy.

The transfer of subsequent information by data selection block 547 continues until gate 545 of address detection block 546 senses that link control circuit 401 is no longer receiving the setup signal on conductor 500 and transmits "0" signal indicating this fact to controller 521 via conductor 562. Controller 521 is responsive to receipt of a "0" via conductor 500 to enter the wait state. Upon entering the latter state, controller 521 prepares link control 401 to receive the acknowledge signal from output port 123. Controller 521 transmits the OPENd signal via conductor 553 which disables gate 535 from transmitting on conductor 552 and also resets flip-flop 537. When the acknowledge signal is received from output port 123 on conductor 552, flip-flop 537 is set; and its Q output transmits a "1" via conductor 554 to controller 521. In response to a "1" on conductor 554, controller 521 retransmits the acknowledge signal to stage 4 and enters the busy state. Controller 521 retransmits the acknowledge signal to stage 4 by transmitting a "1" via conductor 555 to gates 541 through 543. Since the G0 output is a "1", and this fact is transmitted on conductor 568, gate 541 transmits an acknowledge pulse on conductor 501 back to stage 4. In addition, the OPENd signal enables data selection block 547 to transmit data on conductor 552 by enabling gate 535. If link control circuit 401 does not receive an acknowledge signal from output port 123 via conductor 552 before receipt of the path signal, controller 521 is forced into the idle state by receipt of a signal from OR gate 540 and AND gate 539 upon receipt of the path signal by gate 539. The one reason for an acknowledge signal not being received back from output port 123 is that the output port was busy. For nodes in stages 3 and 4, it would also mean that a path could not be set up. Forcing controller 521 to the idle state via OR gate 540 and AND gate 539 by the path signal, assures that the controller 521 does not remain in the wait state indefinitely.

While in the busy state, controller 521 transfers any subsequent data received on conductors 500 and 501 to conductors 551 and 552, respectively, while monitoring the data being transferred to detect the end flag. When the end flag is detected by flag detector 536, which is enabled by the busy signal, a signal indicating this fact is transmitted to controller 521 via OR gate 540. Controller 521 is responsive to the receipt of the end flag indication to enter the idle state.

It is to be understood that the above-described embodiment is merely illustrative of the principles of the invention and that other arrangements may be devised by those skilled in the art without departing from the spirit and scope of the invention.

What is claimed is:

1. A non-blocking switching network for the communication of packets and circuit switched information from network input ports to network output ports, said network comprising:
   a plurality of sequential broadcast stages followed by a plurality of routing stages;
   a plurality of sequential links for sequentially interconnecting said stages;
   each of said broadcast stages comprises a plurality of switch nodes each responsive to the receipt of address signals designating an output port received from one of said input ports for communicating the received address signals as a plurality of sets of said received address signals to all of the interconnected nodes of a subsequent one of said stages;

each of said routing stages comprises a plurality of switch nodes each comprises means responsive to receipt of a plurality of sets of said address signals for selecting one of said sets; and each of said switch nodes of said routing stages further comprises means responsive to the selected one of said sets of address signals for transmitting said one of said sets to the switch node in the subsequent stage designated by said address signals.

2. The network of claim 1 wherein the designated output port responsive to receipt of a signal from one of said nodes of the stage directly interconnected to said designated output port indicating receipt of said set of said address signals for transmitting an acknowledge signal to the interconnected one of said nodes;

said interconnected one of said nodes comprises means responsive to receipt of said acknowledge signal for establishing a path through said interconnected one of said nodes to communicate subsequent data to said designated output port;

said interconnected one of said nodes further comprises means responsive to said acknowledge signal for retransmitting said acknowledge to the node in the next upstream stage from which the selected one of said sets of address signals was received;

each of said nodes in the remaining stages comprises means responsive to the receipt of said acknowledge signal for establishing a path through each for the communication of data between said one of said input ports and said designated output port; and each of said nodes in said remaining stages further comprises means responsive to said receipt of said acknowledge signal for retransmitting said acknowledge signal to the next upstream stage.

3. The network of claim 2 wherein each of said nodes further comprises means responsive to receipt of end signals received via said path for removing said path through each of said nodes receiving said end signals.

4. The network of claim 3 wherein each of said nodes of said broadcast stages further comprises two input terminals each interconnected to an individual one of the links interconnected to the next upstream stage and three output terminals each interconnected to an individual one of said links interconnected to the next subsequent stage;

each of the nodes of the routing stage interconnected to the last one of said broadcast stages further comprises two input terminals each interconnected to an individual one of the links from said last one of said broadcast stage and two output terminals each interconnected to an individual one of the links interconnected to the next subsequent stage; and each of the nodes of the other routing stages further comprises three input terminals each interconnected to an individual one of the links interconnected to the next upstream stage and two output terminals each interconnected to an individual one of the links interconnected to the next subsequent stage.

5. The network of claim 4 wherein each of said nodes of said broadcast stages further comprises a plurality of means each connected to an individual one of said output terminals and to all of said input terminals of each individual node and responsive to receipt of a set of address signals received via one of said input terminals of the individual node for testing the state of the connected output terminal; and means for transmitting said set of address signals via the tested output terminal upon the latter terminal being idle.

6. A nonblocking, self-routing, switching network for communicating packet and circuit switched information, comprising:

a plurality of n routing stages and n-1 broadcast stages;

each of said stages having a plurality of switch nodes;

each of said nodes of said broadcast stages having two input terminals and three output terminals;

each of said nodes of the first sequential routing stage having two input terminals and two output terminals;

each of said nodes of the remaining sequential routing stages having three input terminals and two output terminals;

each of the broadcast nodes comprises means responsive to receipt of address signals by one of said input terminals for retransmitting said address signals to the next downstream stage via all of each individual node's idle output terminals;

each of said broadcast nodes further comprises means responsive to the retransmission of said address signals for entering a state indicative of a path setup operation;

each of the routing nodes comprises means responsive to receipt of said address signals for interrogating said address signals to determine the output terminal designated by said address signals;

each of said routing nodes further comprises means responsive to said receipt for recommunicating said address signals to the next downstream node via the designated output terminal;

each of said routing nodes further comprises means responsive to the recommunication of said address signals for entering said state indicative of said path setup operation; and the state entering means of each of said nodes of said network further responsive to receipt of an acknowledge signal via one of each node's output terminals from the next downstream stage for entering a busy state indicative of the path having been set up through the node.

7. The network of claim 6 wherein each of said nodes of said network further comprises means responsive to receipt of said acknowledge signal for retransmitting said acknowledge signal to the next upstream node.

8. The network of claim 7 wherein each of said routing nodes further comprises means responsive to receipt of a plurality of sets of said address signals each from an individual input terminal for marking one of said input terminals as active on the basis of a predefined priority; and means coupled with said retransmitting means of said acknowledge signal for conveying the latter signal to the marked input for retransmission to said upstream stage.

9. The network of claim 7 wherein each of said broadcast nodes further comprises means responsive to receipt of multiple copies of said acknowledge signal each received on an individual output terminal from the next downstream stage for marking on the basis of a predefined priority one of said output terminals as part of said path.

10. The network of claim 7 wherein each of said nodes of said network further comprises means responsive to receipt of end signals on one of the input terminals for removing the path within the node from the latter input terminal to the previously designated output terminal of said path.

* * * * *